United States Patent [19]

Prince

[11] Patent Number: 5,028,188
[45] Date of Patent: Jul. 2, 1991

[54] EXPANSION BOLT

[75] Inventor: John F. Prince, Syracuse, N.Y.

[73] Assignee: The Eastern Company, Naugatuck, Conn.

[21] Appl. No.: 539,159

[22] Filed: Jun. 18, 1990

[51] Int. Cl.⁵ .................................... F16B 13/06
[52] U.S. Cl. ........................ 411/67; 411/72; 405/259
[58] Field of Search ............. 411/3–5, 63–67, 411/72, 61; 405/259, 260, 261

[56] References Cited

U.S. PATENT DOCUMENTS

| 2,647,431 | 2/1950 | Lewis . | |
|---|---|---|---|
| 2,661,649 | 12/1953 | Skinner . | |
| 3,512,448 | 2/1967 | Summerlin et al. . | |
| 3,524,379 | 11/1968 | Flacher . | |
| 3,726,181 | 4/1973 | Dickow et al. | 411/67 |
| 3,969,976 | 7/1976 | Amico | 411/61 |
| 4,158,983 | 6/1979 | Amico | 411/67 |
| 4,278,006 | 7/1981 | Lobello | 411/72 |
| 4,337,012 | 6/1982 | Sohnius | 411/67 |
| 4,484,848 | 11/1984 | Ott . | |
| 4,770,581 | 9/1988 | Limbrick . | |

Primary Examiner—Neill R. Wilson
Attorney, Agent, or Firm—Wall and Roehrig

[57] ABSTRACT

An expandable mine bolt assembly having a shell and wedge unit threaded upon the shank of an elongated bolt. The shell contains at least one or more leaf sections. The arms of a U-shaped metal strap are joined to the shell and the strap is arranged to pass over the wedge and the distal end of the bolt. At least one arm of the strap is provided with a wrapped section containing folded legs. The distal end of the bolt applies pressure against the strap as the bolt is threaded through the wedge which, in turn, causes the legs of the wrapped section to unfold into holding contact against the wall of a receiving hole thereby preventing the assembly from spinning in the hole as the shell is being expanded by the wedge.

19 Claims, 3 Drawing Sheets

EXPANSION BOLT

BACKGROUND OF THE INVENTION

This invention relates to an expansion bolt of the type used to support the roof of a mine and, in particular, to a mine bolt assembly that has an anti-spinning feature that prevents the assembly from turning in a receiving hole as the bolt is being tightened.

One common form of mine bolt includes a tapered wedge that is threaded onto an elongated bolt. The wedge is arranged to coact with a hollow expansion shell that typically has a pair of opposed leaves. The wedge, in operation, is drawn by the bolt downwards into the shell to expand the leaves and thus drive them outwardly into anchoring contact against the wall of a receiving hole. The outer surfaces of the leaves are elongated and generally furnished with teeth that grip the receiving hole wall. Once anchored in place, the shell securely holds the wedge in place and allows the bolt to be further tightened to draw a support plate tightly against the roof of the mine shaft.

Typically, the leaves of the shell are joined by a channel or U-shaped sheet metal strap. The strap has a pair of parallel arms that are joined to the leaves and a perpendicular base member which passes over the wedge and the distal end of the bolt. A plastic sleeve holds the shell and the wedge together as a unit so that the entire assembly can be easily inserted into a receiving hole. The sleeve has a flange that is of greater diameter than the receiving hole and is stripped away from the assembly as it passes upwardly into the hole. The base of the strap engages the distal end of the bolt as it is threaded upwardly through the wedge whereupon the wedge is driven downwardly into the shell to spread the leaves outward into contact with the wall of a receiving hole. A breakaway plug may be placed in the base of the strap that separates from the strap at a desired bolt pressure thereby permitting the bolt to be further advanced. Although most mine bolts operate in the manner intended to anchor the bolt securely in a receiving hole, there are occasions when the leaves of the shell fail to extend properly and instead of the bolt advancing in the anchor, the entire assembly simply spins in the hole as the bolt is turned. It is a rather time consuming and expensive procedure to extract the "spinner" from the hole and replace it with a sound assembly. Spinners are believed to occur when the strap deforms in an unexpected manner which prevents the leaves from being extended.

SUMMARY OF THE INVENTION

It is therefore an object of the present invention to improve mine bolts.

It is a further object of the present invention to prevent the wedge and shell unit of a mine bolt from spinning in a receiving hole.

It is a still further object of the present invention to provide a mine bolt assembly having a strap that will deform under controlled conditions to engage the wall of a receiving hole to prevent the assembly from spinning in the hole as the bolt is being turned.

Another object of the present invention is to reduce the expenses involved in removing and replacing faulty mine bolts in the field.

These and other objects of the present invention are attained by means of an expandable mine bolt that includes a hollow cylindrical shell that contains a wedge that threadably receives the shank of a bolt. The shell further includes a pair of separable leaves that are joined by a U-shaped strap having a pair of arms that are integral with a base member. In assembly, the strap passes over the top of the wedge and the distal end of the bolt so that the bolt can apply pressure to the base of the strap as it is turned in the wedge. Each arm of the strap also has a wrapped section containing at least two legs folded back against each other. The legs are designed to unfold outwardly into holding contact with the wall of a bolt assembly receiving hole when a predetermined pressure is applied to the strap by the bolt, thus preventing the assembly from spinning in the hole.

BRIEF DESCRIPTION OF THE DRAWINGS

For a better understanding of these and other objects of the present invention, reference shall be made to the following detailed description of the invention which is to be read in association with the accompanying drawings, wherein.

DESCRIPTION OF THE INVENTION

Figure 1:
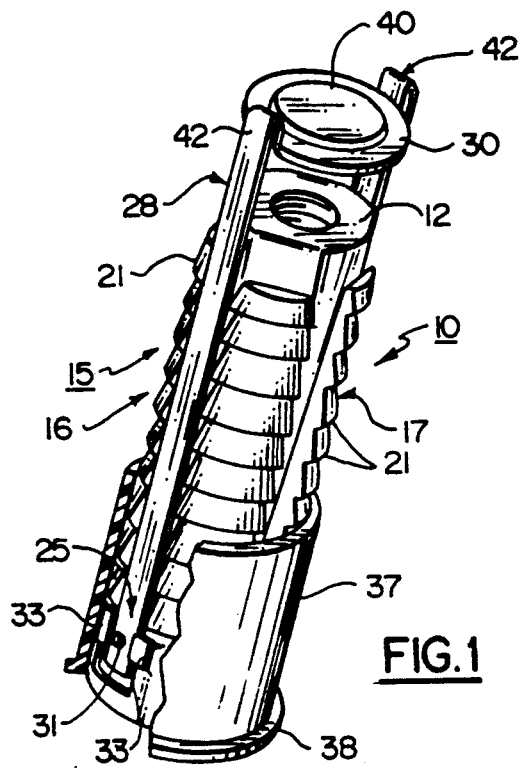
FIG. 1 is a perspective view of an expandable mine bolt assembly embodying the teachings of the present invention.
Figure 2:
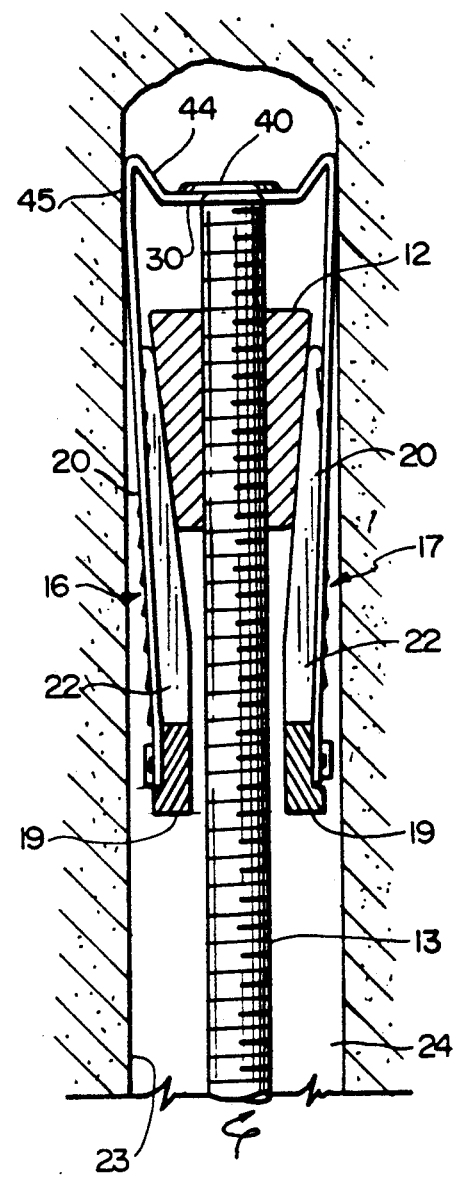
FIG. 2 is a side elevation in section showing the mine bolt assembly illustrated in FIG. 1 seated in a receiving hole.

Turning initially to FIGS. 1–4 of the drawings, there is illustrated a mine bolt assembly generally referenced 10. The assembly includes a tapered wedge 12 that is threaded upon an elongated bolt 13 (FIG. 2). Although not shown, the head end of the bolt supports a radially-disposed plate which is drawn up tightly against the roof of a mine shaft as the bolt is turned in the wedge and thereby helps prevent the roof from collapsing. The wedge is seated within a hollow cylindrical shell 15 that has two half-sections 16 and 17 of the same general size and shape. Each half-section is cast or forged from a suitable metal and contains a semi-circular base 19 from which is extended a vertically-disposed leaf section 20. Each leaf section is furnished with circumferential teeth 21—21 which are used, as will be explained below, to grip the wall of a receiving hole 24 in which the assembly is retained. A vertically-disposed groove 22 is cut in each of the body sections which terminates at a seat, generally referenced 25, cast into the base of the shell.

A portion of the interior surface of each leaf section is tapered to complement the taper formed on the wedge. In operation, the wedge is drawn by the bolt into the shell to force the leaf sections outwardly into contact with the wall of the receiving hole 24. The teeth on the leaf sections bite into the wall surface to securely anchor the bolt assembly within the hole. As noted above, however, on occasion, the wedge and the shell will lock up before the teeth can gain a sufficient hold on the wall of the receiving hole and the two will simply spin or turn in the hole as the bolt is turned. As a consequence, the assembly will not become anchored in the hole and the roof support plate is prevented from being drawn against the roof of the shaft. When this occurs, the faulty bolt assembly must be removed and replaced with a new unit. This is generally a time consuming and costly operation.

The two leaves, or half-sections of the shell, are joined in assembly by a sheet metal strap 28. The strap is a channel-shaped member having a pair of parallel, elongated arms 29—29 that are integral with a perpendicularly-disposed base member 30. Each arm of the strap is mounted in a groove formed in one of the leaf sections with the distal end of the arm situated in a seat 25. The seat is equipped with a pin 31 that is received within a hole 32 (FIG. 4) formed in the arm of the strap. The seat is further equipped with a pair of radially-extended tabs 33—33 that are peened over the distal end of the strap to stake the arm to the base of the shell.

The wedge and shell unit are temporarily held together by a thin plastic sleeve 37 that is slipped over the base section of the shell. The sleeve has a radially-disposed flange 38 that has a diameter greater than the diameter of the receiving hole 24. Accordingly, when the assembly is passed into the receiving hole, the sleeve is automatically removed from the assembly thereby freeing the leaves of the shell.

Figures 3, 4:
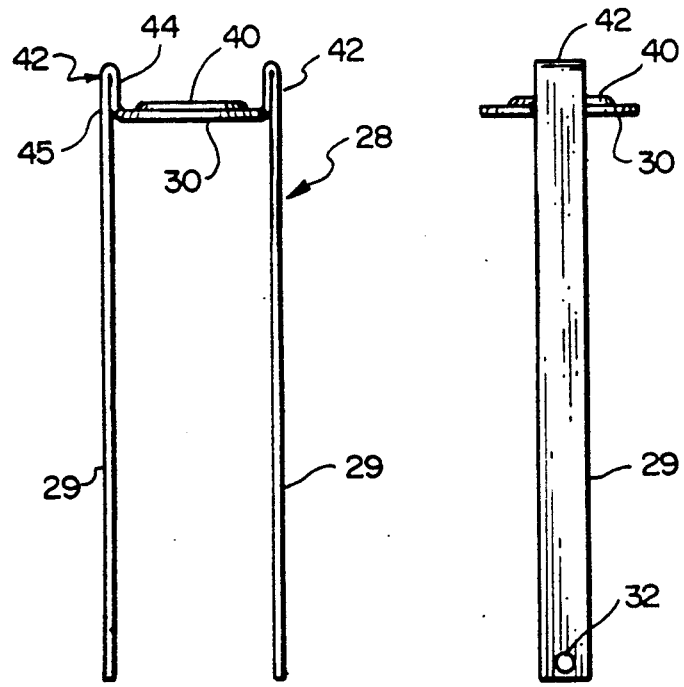
FIG. 3 is a side elevation of the strap used to join the half-sections of the mine bolt shell shown in FIG. 1.
FIG. 4 is an end view of the strap shown in FIG. 3.
Figure 5:
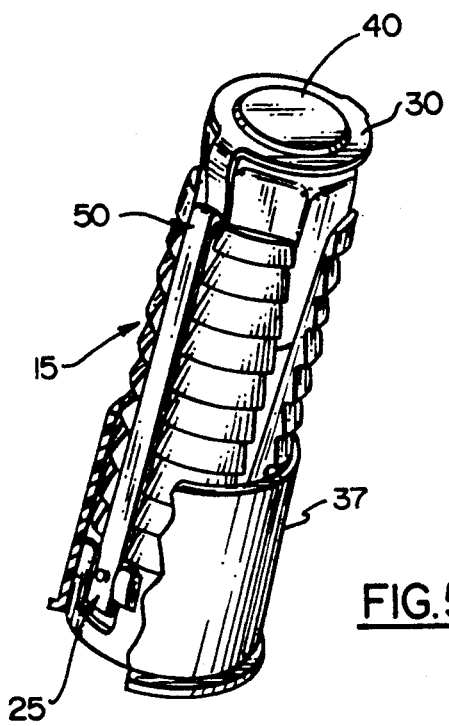
FIG. 5 is a perspective view showing a second embodiment of the present invention.
Figure 6:
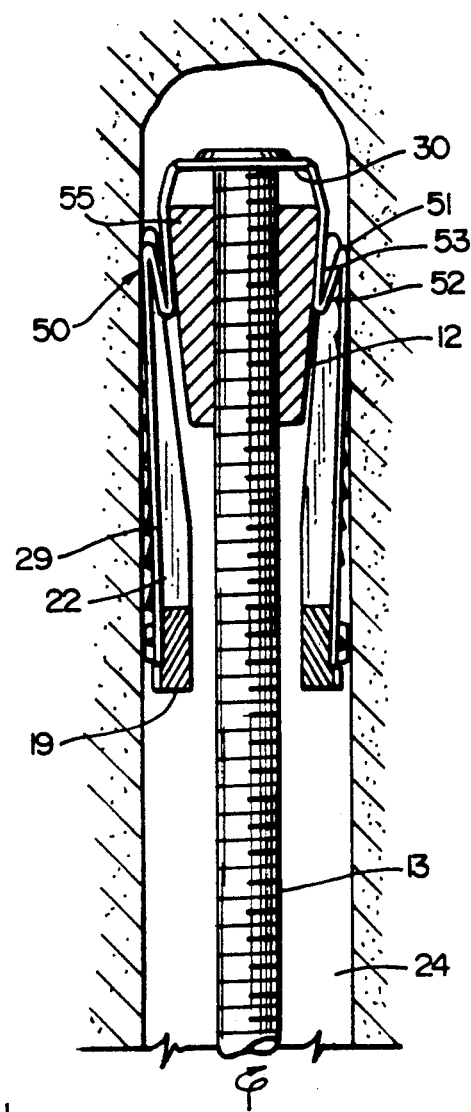
FIG. 6 is a side elevation in section showing the mine bolt of FIG. 5 seated in a receiving hole.
Figures 7, 8:
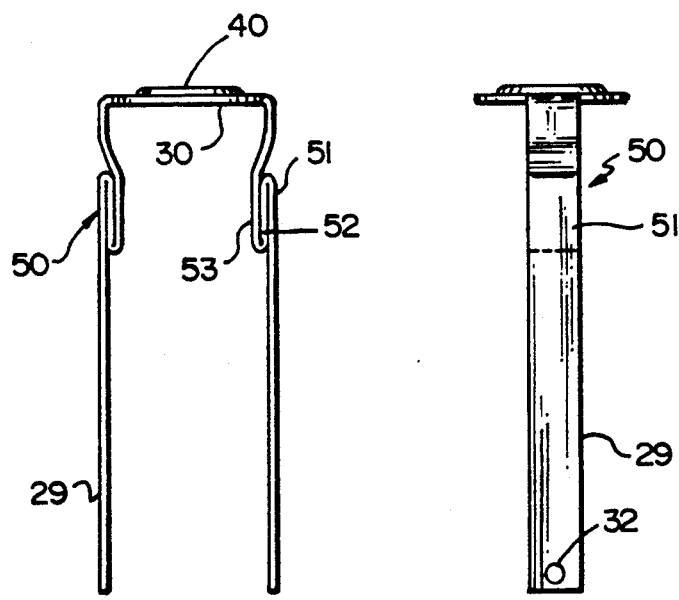
FIG. 7 is a side elevation of the strap configuration used in association with the mine bolt assembly shown in FIG. 5.
FIG. 8 is an end view of the strap shown in FIG. 7.

As best seen in FIG. 2, the strap, in assembly, passes over the wedge and the distal end of the bolt. As the bolt is advanced within the wedge it moves into contact with the base member of the strap. In this particular embodiment of the invention, the base member is furnished with a breakaway cap 40 that is arranged to separate from the strap when a pressure of about 10 torque foot pounds is applied thereto by the bolt and thus allows the distal end of the bolt to pass upwardly through the base member. The strap is further provided with a pair of raised, wrapped sections 42—42 situated at the corners where the strap arms join the base. As illustrated in FIG. 3, the wrapped sections are formed by folding each arm back over itself at the corner. The wrap thus consists of two parallel legs 44 and 45 which are crimped together as shown in FIG. 3 in face-to-face contact. The strap preferably is formed of a metal, such as low carbon steel, that can be bent into the shape illustrated without fracturing. The wrapped legs are designed to unfold when a pressure that is substantially lower than the breakaway cap separation pressure is applied to the strap by the bolt. Preferably, the legs begin unfolding when a pressure of about 5-7 torque foot pounds is applied to the base member of the strap. As can be seen, as the bolt is threaded through the wedge, the bolt will initially force the base of the strap upwardly thus causing the wrapped sections to unfold. The legs of the wrapped sections thereupon expand radially into holding contact with the wall of the receiving hole. This, in turn, provides sufficient holding pressure on the assembly to prevent the wedge and shell unit from spinning in the hole as the bolt is turned. The initial holding pressure continues to act until such time as the wedge is drawn into the shell to a depth whereupon the leaves are expanded into anchoring contact with the wall of the receiving hole. Once the shell is anchored, the support plate can be drawn tightly against the roof of the shaft.

Although the strap of the present invention is shown equipped with a breakaway cap, this particular element is not required for the successful operation of the present invention.

Turning once again to the drawings, wherein like numbers are used to designate like parts, there are shown further embodiments of the present invention. FIGS. 5–8 show a second embodiment of the invention where each arm 29 of the strap contains a wrapped section 50 that is situated in the main body section of the arm below the point where the arm joins the base member 30 of the strap. The wrapped section, in this case, is made up of three separate legs 51–53 and, in assembly, is located adjacent to the crown 55 of the wedge. Here again, the assembly operates as described above to initially unfold the legs of the wrapped section when the base member 30 is pressured by the bolt to gain an initial hold on the wall of the receiving hole. In this particular arrangement, the wedge will aid in the unfolding procedure as it moves into the shell. As should be evident from FIG. 6, a relatively small amount of clearance is typically provided between the assembly and the receiving hole wall so that the wrap need only be unfolded slightly to gain a hold on the wall and thus prevent the assembly from spinning as the support plate is being tightened.

Figures 9, 10:
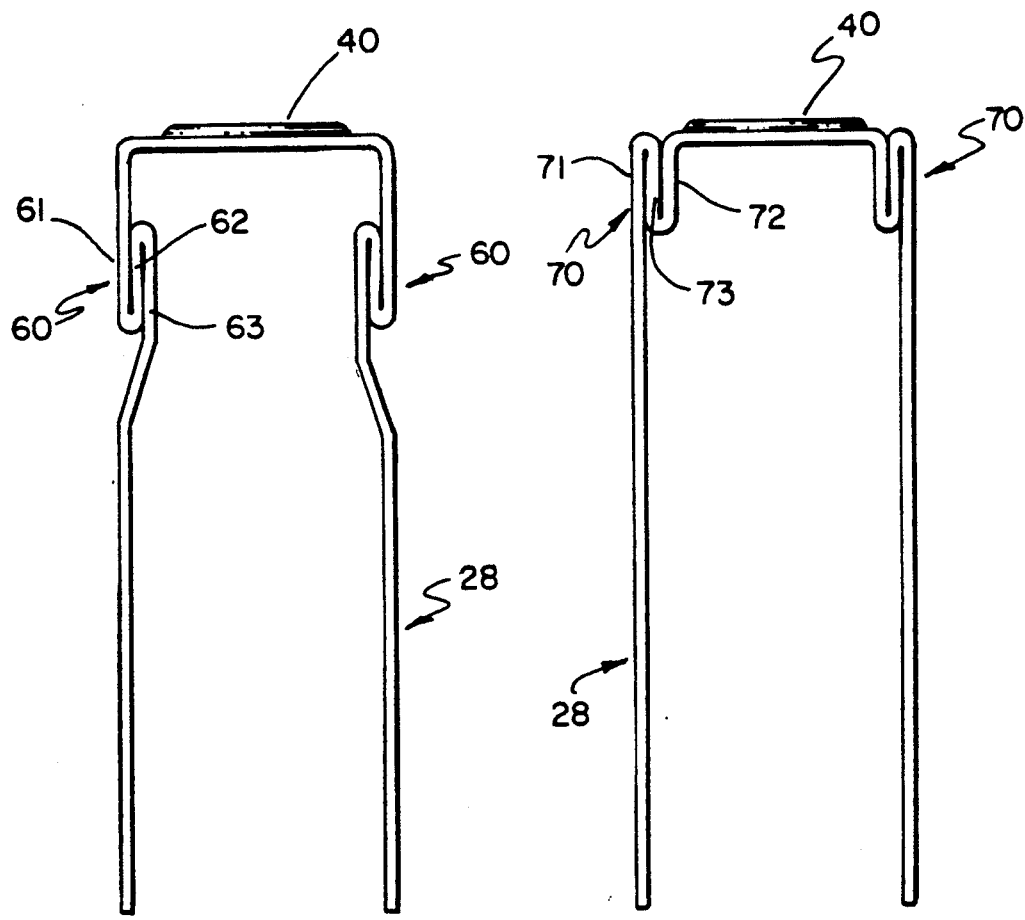
FIG. 9 is a side elevation of a mine bolt strap showing a further embodiment of the invention, and FIG. 10 also a side elevation of a mine bolt strap showing another embodiment of the invention.

FIG. 9 shows a strap similar to that shown in FIGS. 5–8, however, in this case the wrapped section is folded differently than the wrapped section 50. In this case, the outer leg 61 is turned upwardly to form the middle leg 62. The middle leg 62 is then folded downwardly to form the inner leg 63. As can be seen, when the strap is stressed by the bolt, the outer leg will unfold in an upward direction thus providing an additional holding force against the side wall of the retaining hole which helps prevent the assembly from moving downwardly in the hole as the leaf sections are being forced into locking contact against the wall of the retaining hole.

FIG. 10 shows another embodiment of the invention wherein a triple-wrapped section is formed at the two corners of the strap where the arms are connected to the base member. In this configuration, each wrapped section 70 contains an outer leg 71, an intermediate leg 72, and an inner leg 73. The corner wrapper, being close to the point where the bolt stresses the strap, responds rapidly to the stress and thus unfolds quickly. In this corner arrangement, however, the wraps do not protrude beyond the general contour of the strap. This makes the overall bolt assembly compact for ease of packaging and handling.

While this invention has been described with specific detail to the disclosure above, it is not necessarily limited to that description. Rather, any modifications and variations would present themselves to those skilled in the art without departing from the scope and spirit of this invention, as defined in the impending claims.

What is claimed is:

1. An expansion bolt assembly for enclosing a bolt in a receiving hole that includes
    a shell means have at least one expandable leaf section, said shell being in the form of an elongated hollow cylinder that is receivable in a receiving hole,
    a wedge contained in said shell having a tapered outer surface that is capable of being drawn into the top of the shell to outwardly extend the expandable leaf section whereby the expandable leaf section is forced into locking contact against the wall of a receiving hole, an elongated bolt passing upwardly through the bottom of the shell and threadably engaging the wedge, radially expandable strap means for engaging the wall of a receiving hole, said strap means having a pair of upraised arms integral with a base member, each arm being secured to one of the expandable leaf sections and the base member passing over the wedge and the distal end of the bolt, at least one arm of said strap means having a wrapped section containing at least two legs that are folded upon each other and are unfolded into holding engagement with the wall of the hole when the distal end of the bolt is threaded into pressure contact against said strap means, whereby spinning of said bolt assembly with respect to the wall of the hole is prevented.

2. The assembly of claim 1 wherein each arm of the strap contains a wrapped section.

3. The assembly of claim 2 wherein the wrapped section of each strap arm extends upwardly above the top surface of said base member at the corner where said arm joins said base member.

4. The assembly of claim 2 wherein said arms are contained in axially-disposed grooves formed in the expandable leaf sections.

5. The assembly of claim 2 wherein the strap is formed of a flat metallic strip.

6. The assembly of claim 5 wherein the base member contains a breakaway cap for contacting the distal end of the bolt, said breakaway cap being separable from the strap at a pressure that is greater than the pressure required to unfold the legs of the wrapped sections.

7. The assembly of claim 2 wherein said shell means includes a plurality of expandable leaf sections, each expandable leaf section further including a series of circumferentially-disposed teeth for gripping the wall of the receiving hole.

8. A strap for use in a mine bolt assembly that includes two parallel arms integral with a perpendicular base member, means to join each leg to an expandable shell, at least one of said arms containing a wrapped section having at least two folded legs that unfold and radially expand when a predetermined pressure is applied to base member of the strap.

9. The strap of claim 8 wherein both arms of the strap contain a wrapped section.

10. The strap of claim 9 wherein the wrapped section of said arm extends above the base member at a corner where the base member joins said arm.

11. The strap of claim 9 that is formed of sheet metal.

12. A strap for use in a mine bolt assembly that includes two parallel arms integral with a perpendicular base member, means to join each leg to an expandable shell, each arm containing a wrapped section having at least three folded legs that unfold when a predetermined pressure is applied to the strap.

13. The strap of claim 12 wherein the wrapped section is situated in a groove formed in one of said expandable leaf sections.

14. The strap of claim 12 that further includes a breakaway cap in the base member that is arranged to contact the distal end of a mine bolt and separate from the strap at a pressure that is greater than the pressure required to unfold the wrapped legs.

15. The strap of claim 12 that is formed of sheet metal.

16. An expansion bolt assembly for anchoring a bolt in a receiving hold that includes
a shell means having at least one expandable leaf section, said shell being in the form of an elongated hollow cylinder that is receivable in a receiving hole,
a wedge contained in said shell means having a tapered outer surface that is capable of being drawn into the top of the shell to outwardly extend the expandable section whereby the expandable section is forced into locking contact against the wall of a receiving hole,
an elongated bolt passing upwardly through the bottom of the shell and threadably engaging the wedge, a strap means having a pair of upraised arms integral with a base member, each arm being secured to one of the expandable leaf sections and being contained in axially disposed grooves formed in the expandable leaf section and the base member passing over the wedge and the distal end of the bolt,
each arm of the strap having a wrapped section that is contained within one of said grooves.

17. The assembly of claim 16 wherein each wrapped section contains three folded legs.

18. The assembly of claim 16 wherein the groove passes through the expandable leaf section and the wrapped section is situated in the groove adjacent to the wedge contained in said shell.

19. The assembly of claim 16 wherein the strap is formed of a flat metallic strip.

* * * * *